Figure 1:
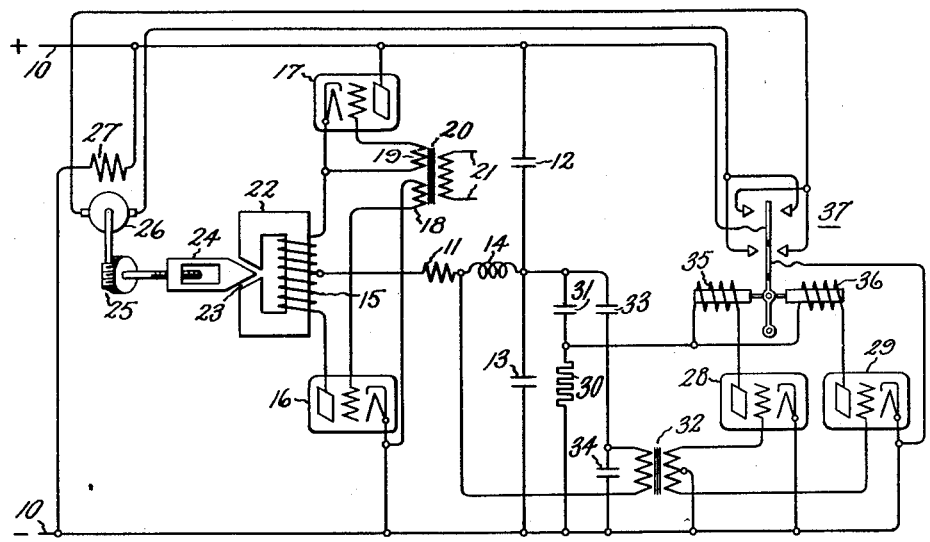

July 25, 1933.  A. S. FITZ GERALD  1,919,976
ELECTRIC POWER CONVERTING APPARATUS
Filed Jan. 26, 1931   2 Sheets-Sheet 1

Inventor:
Alan S. FitzGerald,
by Charles V. Tullar
His Attorney.

Patented July 25, 1933

1,919,976

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC POWER CONVERTING APPARATUS

Application filed January 26, 1931. Serial No. 511,147.

My invention relates to electric power converting apparatus, and more particularly to such apparatus utilizing electric valves for transmitting energy from a direct current circuit to an alternating current circuit.

In United States Letters Patent No. 1,752,247, granted March 25, 1930, upon my application for a patent, there is disclosed an arrangement for converting direct current into alternating current. This apparatus comprises a pair of oscillating circuits, each including an electric valve. It has been found that apparatus of this type operates most economically and delivers an alternating current having a sine wave form only when the constants of the resonant circuits are such that these circuits have a natural frequency which is substantially equal to the frequency of the grid excitation of the electric valve. On the other hand it often becomes desirable to operate such electric power converting apparatus over a considerable range of frequency variation.

It is an object of my invention to provide an improved electric power converting apparatus which will operate satisfactorily over a considerable range of frequency variation.

It is another object of my invention to provide an improved electric power converting apparatus including a resonant circuit in which any departure of the frequency of the alternating current circuit, or the frequency of the grid exciting circuit by which it is determined, from the natural frequency of the resonant circuit will automatically change the constants of the resonant circuit to change its natural frequency to that of the alternating current circuit.

It is a further object of my invention to provide an improved electric power converting apparatus utilizing electric valves and including a resonant circuit in which any departure of the wave form of the potential of the alternating current circuit from a sinusoid will automatically vary the constants of the resonant circuit so as to produce an alternating potential having a substantially sinusoidal wave form.

In accordance with the illustrated embodiments of my invention I provide an electric power converting apparatus similar to that described in the above mentioned patent. This apparatus includes a pair of resonant circuits each including a reactor provided with a variable air gap. The reluctance of the magnetic core of this reactor is determined by a motor driven movable armature. Means are provided which are responsive to a departure of the wave form of the alternating potential from a sinusoid to control the operation of the motor to increase or decrease the air gap of the reactor and thus change the natural frequency of the resonant circuit to correspond with that of the alternating current circuit.

Figure 2:
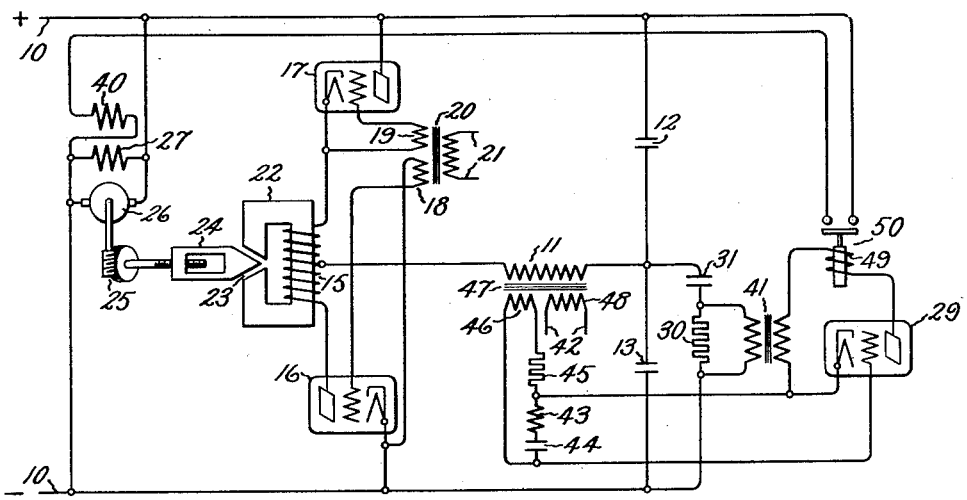
Figure 3:
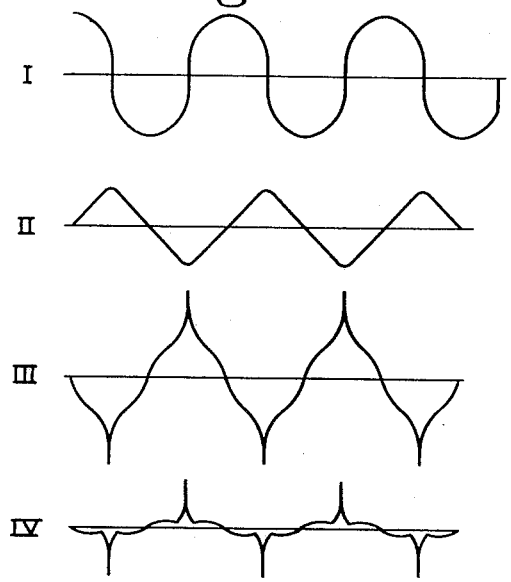
Figure 4:
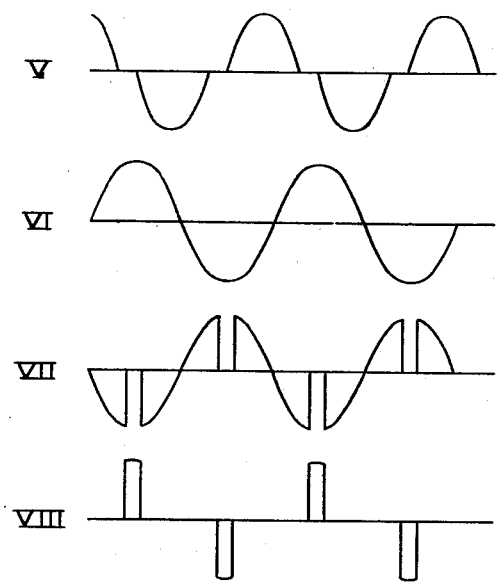

For a better understanding of my invention together with other and further objects thereof, reference is had to the following description taken in connection with the accompanying drawings and its scope will be pointed out in the appended claims. In the accompanying drawings, Fig. 1 is a diagrammatic representation of my invention as applied to an electric power converting apparatus similar to that described in the above mentioned patent; Fig. 2 illustrates a modification of my invention, while Figs. 3 and 4 show certain operating characteristics of the apparatus illustrated in Figs. 1 and 2.

Referring to Fig. 1 of the drawings, I have illustrated an arrangement for receiving energy from the direct current circuit 10, converting it into alternating current, and delivering it to the load device 11, which may be an energy consuming device or a translating device, such as the primary winding of a power transformer. This apparatus comprises capacitors 12 and 13, a resonant circuit for charging capacitor 12 from the circuit 10 comprising a reactor 14, the load device 11, the lower half of an inductive winding 15, and an electric valve 16; and a resonant charging circuit for capacitor 13 comprising an electric valve 17, the upper half of the inductive winding 15, the load device 11, and the reactor 14. It will be noted that the charging circuit of each capacitor forms a discharge circuit for the other capacitor. Electric valves 16 and 17 are each provided with an anode, a cathode and a control grid and may be of any of the several types well known in the art, although I prefer to use valves of the vapor electric discharge type in which the starting of the current in the valve is determined by the potential on its control grid but in which the current through the valve may be interrupted only by reducing its anode potential below the critical value. The control grids of electric valves 16 and 17 are energized from the secondary windings 18 and 19 respectively of a grid transformer 20, the primary winding of which is energized from a source of alternating current 21. The inductive winding 15 is wound on a magnetic core member 22 provided with an air gap 23 and a cooperating adjustable core member 24. The position of the armature member 24 is adapted to be adjusted by any suitable motor operating mechanism such, for example, as the gearing 25 and a direct current motor 26 provided with a field winding 27 connected directly across the direct current circuit 10.

In order to obtain an indication of the departure of the frequency of the alternating current delivered to the load device 11 from the natural frequency of the resonant circuits, I have provided a pair of electric valves 28 and 29, each provided with an anode, a cathode, and a control grid, and preferably of the vapor electric discharge type. The anode circuits of these valves are energized in accordance with the potential across capacitor 13 by a potential which is derived from a resistor 30 connected in parallel to the capacitor 13 through a blocking condenser 31. The grids of the valves 28 and 29 are energized from opposite halves of the secondary winding of a grid transformer 32, the primary winding of which is energized in accordance with the potential across one half of the inductive winding 15 and the capacitor 13. A potential proportional to the potential across these two circuit elements is obtained by connecting the primary winding of the transformer 32 across the reactor 14 and a capacitor 33 which forms one element of a capacitance potentiometer made up of capacitors 33 and 34. The anode circuits of electric valves 28 and 29 include the operating coils 35 and 36 respectively of a contactor 37. When this contactor is in one operating position it connects the armature of the motor 26 across the the direct current circuit 10 to vary the position of the movable armature 24. When it is in the other operating position it connects the armature of the motor 26 across the circuit 10 with an opposite polarity so as to operate the motor in the opposite direction, as will be well understood by those skilled in the art.

The general principles of operation of the above described power circuit will be well understood by those skilled in the art or may be found explained in detail in the above mentioned Patent No. 1,752,247. In brief, assuming that electric valve 17 is first made conductive, the capacitor 13 is charged from the circuit 10 through the valve 17, the upper half of inductive winding 15, the load device 11, and reactor 14. When the grid potential reverses polarity and electric valve 16 is made conductive capacitor 12 becomes charged from the circuit 10 through reactor 14, load device 11, the lower half of inductive winding and electric valve 16 and at the same time capacitor 13 discharges through this circuit. Thus it is seen that during successive half cycles of grid potential the power current flows in opposite direction through the load device 11, that is, an alternating current is delivered to this device.

If the frequency of the alternating grid exciting potential is the same as the natural frequency of the charging and discharging circuits of the capacitors, the alternating current delivered to the load device 11 will be sinusoidal in wave form. However, if the frequency of the alternating potential used to excite the grid is higher than the natural frequency of the resonant circuits, the valve which is passing no current will be made conductive before one capacitor is completely charged and the other is completely discharged, that is, before current is completely interrupted in the other valve. However, the current rises very rapidly in the last valve to be made conductive and this current flowing through one half of inductive winding 15 induces a potential in the other half of this winding of such a direction and magnitude as to instantly interrupt the current flowing in the other valve. The result is that the wave form of alternating current delivered to the load device 11 is a sinusoid with a small initial and final portion of each half cycle chopped off. This wave form is illustrated by curve I of Fig. 3. In this same figure curve II represents the potential across one of the capacitors, for example, capacitor 13, while curve III represents the equivalent alternating potential across the inductive winding 15 or the actual potential across reactor 14. From the explanation above it is seen that the current flowing through inductive winding 15 is always in the same direction so that its potential drop is a pulsating unidirectional one. However, curve III represents its equivalent potential drop as referred to the alternating current circuit 11. The very sharp peaks of the wave shown in curve III are obviously due to the rapid interruption of the current in one of the valve circuits and the rapid building up of current in the other valve circuit.

Curve IV of Fig. 3 represents the summation of curves II and III, that is, the potential across each of the capacitors and its corresponding portion of the reactor 15 as referred to the alternating current circuit. It is seen that the potential represented by curve IV is in direct phase opposition to the potential across the capacitors represented by curve II.

On the other hand, if the frequency of the grid potential is lower than the natural frequency of the resonant circuits, one of the capacitors will become completely charged and the other capacitor completely discharged a short interval before the grid potential reverses polarity thus rendering the other valve conducting. This condition is represented by the curves of Fig. 4 in which curve V represents the current delivered to the load device 11 which, it is seen, comprises a series of half sine waves separated by short intervals in which no current is flowing. Curve VI represents the potential across one of the capacitors and is sinusoidal except for a slight flattening of the top of the wave. Curve VII represents the potential across the inductive winding 15, as referred to the alternating current circuit, which is sinusoidal except for a short interval during which no current is flowing when, of course, there is no potential across the inductive winding. Curve VIII represents the resultant of curves VI and VII, that is, the potential across one of the capacitors and a half of the inductive winding 15 as referred to the alternating current circuit. It is seen that this resultant as represented in curve VIII is in phase with the potential across the capacitor as shown in curve VI. It will be obvious that, when the frequency of the grid potential is equal to the natural frequency of the resonant circuits, the potentials across the capacitors and the reactor are both of sinusoidal wave form and are equal and opposite in phase so that the resultant of these two potentials is zero. From the above it is clear that an indication of the relation between the frequency of the grid potential and the natural frequency of the resonant circuits can be obtained by the relation between the potential across one of the capacitors and the resultant potential across this capacitor and its respective portion of the inductive winding 15; that is, when the grid potential has a frequency above the natural frequency of the resonant circuits, the resultant potential is in phase opposition to the potential across one of the capacitors; when the two frequencies are equal, the potentials across each capacitor and its respective portion of the inductive winding 15 are equal and opposite in phase and their summation is equal to zero; and when the frequency of the grid potential is lower than that of the natural frequency of the resonant circuits, the resultant potential is directly in phase with the potential across the capacitors. This phenomenon has been utilized in the above described circuits as follows: The resistor 30, which is connected in parallel to the capacitor 13 through a blocking capacitor 31 to block out any direct current component, has a terminal potential substantially equal to that of capacitor 13. In order to obtain a potential equal to that across inductive winding 15, as referred to the alternating current circuit, a small reactor 14 is included in series with the load device 11 so that the potential across it is at all times proportional to the desired potential across inductive winding 15. A capacitance potentiometer comprising capacitors 33 and 34 is connected in parallel to the capacitor 13 and is so proportioned that the capacitance of the element 33 bears the same ratio to the sum of the circuit elements 33 and 34 that the inductance of the element 14 bears to the sum of the inductances of the element 14 and a half of inductive winding 15. The primary winding of the grid transformer 32, which is energized across reactor 14 and capacitor 33, is thus energized with potential which is at all times proportional to resultant potentials indicated in curves IV and VIII of Figs. 3 and 4 respectively. The anodes of the valves 28 and 29 are both energized directly across the resistor 30 while the grids of these two valves are energized from opposite halves of the secondary winding of the grid transformer 32 with the result that when conditions are such as depicted in Fig. 3, the grid potential of one of the valves, for example valve 28, is in phase with its anode potential and the operating coil 35 of the switch 37 is energized to actuate the switch to its left hand position. With the switch 37 in this position, the motor 26 is connected across the circuit 10 to withdraw the armature 24 and thus increase the air gap of the core member 22 to decrease the inductance of the winding 15 and thus raise the natural frequency of the resonant circuits to the frequency of the grid potential supplied from the circuit 21. When the frequencies have become balanced, the resultant of the potential across reactor 14 and capacitor 33 is reduced to zero, as explained above, so that the grids of valves 28 and 29 are deenergized to render them non-conductive, the operating coil 35 is deenergized, the switch arm of contactor 37 is returned to its neutral position, to which it is preferably biased, and the movement of the armature 24 is stopped. It will be apparent that, should the frequency of the grid potential fall below that of the natural frequency of the resonant circuits, the reverse operation will take place. In this case the grid potentials of the valves 28 and 29 will be reversed in polarity so that the valve 29 is made conductive while valve 28 is nonconductive. While the above described apparatus is particularly suitable for use in connection with electric power converting apparatus such as disclosed in my above mentioned patent, it will be apparent that it is of general application and may be used to obtain an indication of the departure of the frequency of any alternating current circuit from the natural frequency of a resonant circuit to which it supplies energy.

In the modification of my invention illustrated in Fig. 2, the motor 26 has both its armature winding 26 and field winding 27 connected directly across the direct current circuit 10. The connections are such that the motor tends to withdraw the armature member 24, thus continuously tending to increase the natural frequency of the resonant circuits. The motor 26 is also provided with a field winding 40 which is differentially wound with respect to the field winding 27 and so proportioned as to cause the motor 26 to operate in the opposite direction when energizing. In this arrangement the anode circuit of electric valve 29 is energized in accordance with the potential across resistor 30 through a transformer 41, while the grid circuit is energized across reactor 43 and the capacitor 44 connected in series with a resistor 45 and energized from an auxiliary winding 46 of a main power transformer 47. In this arrangement the winding 11 comprises a primary winding of the transformer 47 while the load circuit 42 is connected to te main secondary winding 48. The anode circuit of electric valve 29 includes the operating coil 49 of a contactor 50 which is adapted to energize the field winding 40 across the direct current circuit 10. The operation of this arrangement is similar in many respects to that described in connection with Fig. 1 but is intermittent in its operation. As stated above, motor 26 is normally energized to gradually withdraw the armature 24 and thus gradually increase the natural frequency of the resonant circuits. When the frequency of these circuits rises above that of the grid potential supplied by the circuit 21, the potential of the grid of electric valve 29, which is energized across reactor 43 and capacitor 44, becomes in phase with the anode potential of this valve and the contactor 50 is actuated to energize the field winding 40. The energization of the winding 40 reverses the operation of the motor 26 so as to insert the armature 24 in the air gap 23 and thus lower the natural frequency of the resonant circuits. When the frequencies have been balanced, the grid potential of electric valve 29 is reduced to zero so that the valve is non-conductive and the operating coil 49 of the contactor 50 is deenergized. This cycle will be repeated indefinitely. It will be apparent that reactor 43 and capacitor 44 have reactances proportional to those of the inductive winding 15 and the capacitors 12 and 13 respectively. In certain cases it has been found that a more sensitive control may be obtained by the transformer connections for supplying the grid and anode of electric valve 29 as illustrated in this modification.

While I have described what I at present consider preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a supply circuit, a load circuit, one of said circuits being an alternating current circuit, a translating circuit for transmitting energy therebetween including a resonant circuit, and means responsive to a departure of the frequency of the current in said alternating current circuit from the natural frequency of the resonant circuit for varying the natural frequency of said resonant circuit.

2. In combination, an alternating current circuit, a direct current circuit, apparatus for transmitting energy therebetween including a resonant circuit, and means responsive to a departure of the frequency of the current in said alternating current circuit from the natural frequency of the resonant circuit for varying the reactance of one of the elements of the resonant circuit.

3. In combination, a direct current supply circuit, an alternating current load circuit, apparatus including a resonant circuit comprising a reactor and a capacitor for transmitting energy from said supply circuit to said load circuit, and means responsive to a departure of the frequency of the current in said alternating current circuit from the natural frequency of the resonant circuit for varying the reactance of said reactor.

4. The combination of a plurality of electric valves, a capacitor, a resonant capacitor charging circuit including one of said valves, a resonant capacitor discharging circuit including another of said valves, an alternating current circuit common to said charging and discharging circuits, and means responsive to a departure of the frequency of the current in said alternating current circuit from the natural frequency of the resonant circuits for varying the natural frequency of said resonant circuits.

5. In combination, an alternating current circuit, a translating circuit connected thereto and including a resonant circuit provided with an adjustable air gap reactor, motor operated means for adjusting the air gap of said reactor, and means responsive to a departure of the frequency of the current in said alternating current circuit from the natural frequency of the resonant circuit for controlling said motor.

6. In combination, an alternating current circuit, a translating circuit connected thereto and including a resonant circuit provided with an adjustable air gap reactor, motor operated means for adjusting the air gap of said reactor, and means responsive to a rise in frequency of the current in said alternating current circuit above the natural frequency of said resonant circuit to operate said motor to increase said air gap and responsive to a drop in the frequency of said current below that of said resonant circuit to operate said motor to decrease said air gap.

7. In combination, a supply circuit, a load circuit, one of said circuits being an alternating current circuit, a translating circuit for transmitting energy therebetween including a resonant circuit, means normally tending to vary the natural frequency of said resonant circuit in one direction and means responsive to a departure of the frequency of said alternating current circuit from the natural frequency of the resonant circuit for overcoming the effect of said first mentioned means to vary the natural frequency of said resonant circuit in the opposite direction.

8. In combination, an alternating current circuit, a translating circuit connected thereto and including a resonant circuit, means normally tending to increase the inductance of said resonant circuit, and means responsive to a departure of the frequency of said alternating current circuit from the natural frequency of the resonant circuit for overcoming the effect of said first mentioned means to decrease the inductance of said resonant circuit.

9. In combination, an alternating current circuit, a translating circuit connected thereto and including a resonant circuit provided with an adjustable air gap reactor, means normally tending to decrease the air gap of said reactor, and means responsive to a rise in frequency of the current in said alternating current circuit above the natural frequency of said resonant circuit for overcoming said first mentioned means to increase the air gap of said reactor.

10. In combination, an alternating current circuit, a translating circuit connected thereto and including a resonant circuit provided with an adjustable air gap reactor, a motor for adjusting said air gap, said motor being provided with a pair of field windings one of which is so connected as normally to decrease the air gap of said reactor, and means responsive to a rise in frequency of the current in said alternating current circuit above the natural frequency of said resonant circuit for energizing the other motor field winding to reverse the motor to increase said air gap.

11. In combination, an alternating current circuit, a translating circuit connected thereto and including a resonant circuit, and means responsive to a departure of the wave form of the potential of the alternating current circuit from a sinusoid for varying the resonant frequency of said resonant circuit.

12. In combination, a direct current supply circuit, an alternating current load circuit, apparatus for transmitting energy from said supply circuit to said load circuit including a resonant circuit, and means responsive to a departure of the wave form of the potential of the alternating current circuit from a sinusoid for varying the resonant frequency of said resonant circuit.

13. In combination, an alternating current circuit, a resonant circuit connected thereto, and means for giving an indication of the departure of the frequency of the current of said alternating current circuit from the natural frequency of said resonant circuit comprising means responsive to the departure of the wave form of the potential of said alternating current circuit from a sinusoid.

14. In combination, an alternating current circuit, a resonant circuit connected thereto and including a plurality of impedance elements, and means responsive to a departure of the frequency of the current of said alternating current circuit from the natural frequency of said resonant circuit comprising an electric valve provided with input and output electrodes, means for energizing one of said electrodes in accordance with the potential across one of said impedance elements and means for energizing the other electrode in accordance with the potential across other of said impedance elements.

15. In combination, an alternating current circuit, a resonant circuit connected thereto and including a serially connected reactor and capacitor, and means responsive to a departure of the frequency of the current of said alternating current circuit from the natural frequency of said resonant circuit comprising an electric valve provided with input and output electrodes, a circuit for energizing one of said electrodes in accordance with the potential across said capacitor and a second circuit for energizing the other electrode in accordance with the potential across said reactor and capacitor.

ALAN S. FITZ GERALD.